United States Patent [19]
Kato

[11] Patent Number: 5,341,186
[45] Date of Patent: Aug. 23, 1994

[54] ACTIVE AUTOFOCUSING TYPE RANGEFINDER OPTICAL SYSTEM

[75] Inventor: Shigeru Kato, Tokyo, Japan

[73] Assignee: Olympus Optical Co., Ltd., Tokyo, Japan

[21] Appl. No.: 3,431

[22] Filed: Jan. 12, 1993

[30] Foreign Application Priority Data

Jan. 13, 1992 [JP] Japan .................... 4-003957

[51] Int. Cl.$^5$ .................... G03B 13/36
[52] U.S. Cl. .................... 354/403; 354/165
[58] Field of Search .................... 354/403, 162, 163, 165, 354/166

[56] References Cited

U.S. PATENT DOCUMENTS

| | | | |
|---|---|---|---|
| 2,360,822 | 10/1944 | Altman | 354/162 |
| 4,072,969 | 2/1978 | Cheavin | 354/166 |
| 4,360,256 | 11/1982 | Grassl | 354/403 |
| 4,534,637 | 8/1985 | Suzuki et al. | 354/403 |
| 4,575,211 | 3/1986 | Matsumura et al. | 354/403 |
| 5,270,758 | 12/1993 | Morooka | 354/166 |

FOREIGN PATENT DOCUMENTS 57-64217 4/1982 Japan .

Primary Examiner—Russell E. Adams
Attorney, Agent, or Firm—Cushman, Darby & Cushman

[57] ABSTRACT

The invention concerns an active autofocusing type rangefinder optical system that prevents a finder system and a light projection system from producing parallax and is capable of finding the distance of an object with high accuracy, in which an optical path-splitting means Bs is located somewhere in the optical path of the objective optical system thereof that is provided separately from a taking or photographic optical system, one of the optical path split by said splitting means being assigned to said finder optical system and the other to a range finding optical system, wherein a portion of the optical system located on the object side from said optical path-splitting means has a positive refracting power as a whole, a portion of the optical system extending from said optical path-splitting means to the intermediate image-forming surface of the finder optical system has a positive or negative refracting power as a whole, and a portion of the optical system located on the side of said range finding element from said optical path-splitting means.

5 Claims, 14 Drawing Sheets

Spherical aberration
2 mm

-1.0   1.0 diop.

Astigmatism
ω 24°

-2.0   2.0 diop.

Distortion
ω 24°

-5.0   5.0 %

Spherical aberration
F.No 1.11

-0.5   0.5 mm

Spherical aberration
2 mm

Astigmatism
ω 25.2°

Distortion
ω 25.2°

Spherical aberration
2 mm

Astigmatism
ω 19.5°

Distortion
ω 19.5°

Spherical aberration 2 mm

Astigmatism ω 15.4°

Distortion ω 15.4°

Spherical aberration
F.NO 2.06

−0.5  0.5 mm

Astigmatism
ω 9.1°

−0.5  0.5 mm

Distortion
ω 9.1°

−5.0  5.0 %

Spherical aberration
F.NO 2.06

−0.5  0.5 mm

Astigmatism
ω 7.3°

−0.5  0.5 mm

Distortion
ω 7.3°

−5.0  5.0 %

Spherical aberration
F.NO 2.06

Astigmatism

ω 5.9°

Distortion

ω 5.9°

ACTIVE AUTOFOCUSING TYPE RANGEFINDER OPTICAL SYSTEM

BACKGROUND OF THE INVENTION

The present invention relates to an active autofocusing type rangefinder optical system that includes a finder system separately from a taking lens and is designed to project luminous flux from a light source through a part of the finder system on the object to be shot at or photographed and receive the luminous flux reflected from the object, thereby finding the distance of the object automatically to drive the lens to the focused point.

As well known in the art, rangefinder instruments used on compact cameras and the like make use of the infrared projecting, active autofocusing type trigonometrical range finding technique in which infrared light is projected from an infrared light-emitting diode (IRED) through a light projection lens on the object to be shot at or photographed, and the light reflected from the object is received by a semiconductor position sensor device (PSD) through a reception lens that is spaced away from the projection lens by a certain distance, i.e., the base length, so that the distance of the object can be found by the position on which that reflected light is incident.

Since the projection lens is usually located separately from the finder optical system, their optical axes cause parallax, making the distance of the object vary the relation between the range finding frame showing the range finding scope in the finder and the position of the spot of the light projected through an actual light projection lens. As a result, the camera is often out of focus, contrary to the photographer's aim.

As set forth in JP-A-57-64217, such a problem is known to be overcome by splitting one optical path on the object side into two optical sub-paths through a light splitter, one being assigned to the reception lens system and the other to the finder system, so that the axis of light incident on the reception lens system can coincide with the axis of light incident on the finder system to eliminate parallax.

This JP-A-57-64217 achieves its object by using the following construction.

(1) An optical path-splitting plain mirror is located on the side proximate to the object, and finder and light reception systems are each constructed from an independent optical system.

(2) An optical path-splitting plain mirror is located between the objective and ocular systems of a virtual image type finder system, and a light reception system is constructed from a composite optical system comprising a lens located after the splitter and an objective system.

(3) An optical path-splitting plain mirror is located between the objective system and intermediate image-forming surface of a real image type finder system, and the objective system is used directly as a light reception system.

However, the arrangement (1) mentioned above has the disadvantage of making the camera thick, because it is required to locate the mirror on the object side of the finder system.

The arrangement (2) renders it difficult to make the camera compact, because the objective system of the virtual image type finder system having a negative power must be used for the first unit of the reception system, when the F-number of the reception system is decreased to increase the quantity of light of the projected spot so as to estimate a long distance with high accuracy; the aperture of the second unit of positive power, located after the splitter, is larger than is in the case of a light reception system made up of a single lens.

In the case of (3), with the same lens system it is difficult to make an appropriate compromise between the performance of the finder objective system having a large F-number but a wide field angle and the performance of the reception system having a small field angle but a small F-number.

SUMMARY OF THE INVENTION

In view of such situations as mentioned above, an object of the invention is to provide an active autofocusing type rangefinder optical system that is free from the prior art problems mentioned above, prevents a finder system and a light projection system from producing parallax, and is capable of finding the distance of an object with high accuracy.

According to the invention, the object mentioned above is achieved by an active autofocusing type rangefinder optical system for cameras in which an optical path-splitting means is located somewhere in the optical path of the objective optical system thereof that is provided separately from a taking or photographic optical system, one of the optical path split by said splitting means being assigned to said finder optical system and the other to a range finding optical system, wherein:

said range finding optical system includes a range finding element, a portion of the optical system located on the object side from said optical path-splitting means has a positive refracting power as a whole, a portion of the optical system extending from said optical path-splitting means to the intermediate image-forming surface of the finder optical system has a positive or negative refracting power as a whole, and a portion of the optical system located on the side of said range finding element from said optical path-spitting means.

Preferably, the range finding element is made up of a light-emitting element, and a light receiving element is located in the finder optical system or in the vicinity thereof. The object to be shot at or photographed is irradiated with the light emitted from the light-emitting element, and the light reflected off the object is received by the light receiving element, so that the distance of the object can be found.

Further, the optical path-splitting means may be of such wavelength selectivity as to make a division between a visible range of light and an infrared range of light.

Still further, the range finding element may be located at the rearmost of the range finding optical system to make the final surface of the range finding optical system convex or concave to the object side. It is then desired that the following condition (1) be satisfied:

$$\phi/f_B > 0.3 \qquad \ldots (1)$$

where $\phi$ is the diameter of the maximum circle that encircles the final surface of the range finding optical system and $f_B$ is the space between the final surface of the range finding optical system and the light-emitting surface of the light-emitting element.

Still further, the finder optical system may include an image-erecting system for inverting and reversing an intermediate image produced by the objective optical system.

In the invention, the objective optical system of the finder optical system is divided somewhere in its optical path to make a portion of the lens system located after the optical path-splitting means constitute finder and light projection systems that are separate from each other, so that focal length determination and aberration correction can be optimized for each, making it possible to improve the capability of the light projection system to find the distance of the object due to its increased aperture without detriment to the performance of the finder system.

Since the portion of the finder objective system located before the optical path-splitting means is of positive refracting power, the lens's effective diameter of the portion of the light projection system located after the optical path-splitting means is not increased, even when the aperture of the light projection system is increased.

It is desired that the light projection system conform to the following conditional formula (1):

$$\phi/f_B > 0.3 \qquad \ldots (1)$$

where $\phi$ is the diameter of the maximum circle that encircles the final surface of the range finding optical system and $f_B$ is the space between the final surface of the light projection system on the light-emitting element side and the light-emitting surface of the light-emitting element.

Below the lower limit of Condition (1) it is impossible to allow the light projection system to accept the light diverging from the light-emitting element with good efficiency, making the quantity of light projected on the object insufficient. In this context, it is noted that when the range finding element the rangefinder optical system has is a light-emitting element, this rangefinder optical system also serves as a light projection system. Then, the final surface of the light projection system on the side of the light-emitting element forms the final surface of the rangefinder optical system on the side of the range finding element. In this connection, it is noted that $\phi$ or the diameter of the maximum circle that encircles the final surface of the light projection system Pr on the side of the light-emitting element and fB or the space between the final surface of the range finding optical system and the light-emitting surface of the light-emitting element E are shown in the perspective view in the form of FIG. 6.

The finder system of the invention is a real image type finder with the objective system of positive refracting power, but it is then required to use an erect, orthoscopic image system for inverting and reversing the intermediate image. When the erect, orthoscopic image system is constructed by a combination of reflective surfaces, it is preferable to use the optical path-splitting surface as one surface of the four surfaces that are ordinarily needed, because a layout containing no useless space can be achieved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

The invention will now be explained, by way of example but not by way of limitation, with reference to the following drawings, in which:

FIG. 16 represents in section the projection system in Examples 3 at the (a) wide angle end, (b) intermediate field angle and (c) telephoto end, FIG. 17 provides an illustration of what state the finder's field of view in Example 3 is in.

DESCRIPTION OF THE PREFERRED EMBODIMENTS

In the following description, explanation will be made of the application of the invention to cameras with reference to the drawings.

Figure 1:
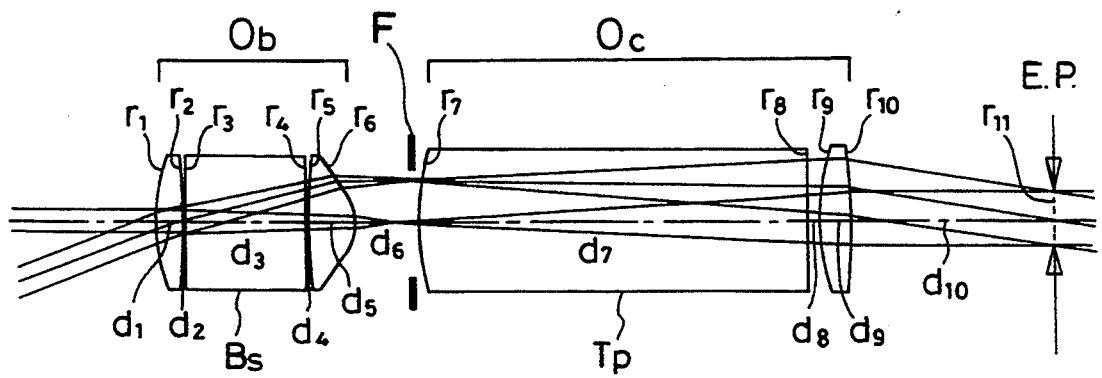
FIG. 1 is a sectional view of the finder system for cameras in Example 1 according to the invention.
Figure 7:
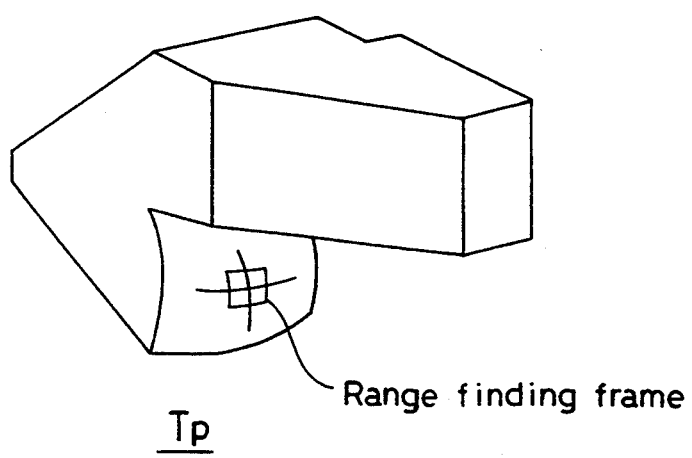
FIG. 7 is a perspective view of the triad reflecting prism.

Example 1 is directed to the application of the invention to a single-focus camera. As illustrated in section in FIG. 1, the finder system includes an objective system that consists of, in order from the object side, a positive lens, a beam-splitting prism Bs and a positive lens, and is designed such that the image produced by the objective system Ob is formed on the incident surface of a triad reflecting prism Tp. A range finding frame showing the position of a spot on which light is to be projected is marked on the incident surface of the triad reflecting prism Tp (see FIG. 7), and a visual field frame F determining the visual field range is located in the vicinity of that incident surface. An ocular system Oc consists of the above-mentioned triad reflecting prism Tp and a positive lens located on the photographer side. An intermediate image produced by the objective system Ob is made erect and orthoscopic by one reflecting surface of the beam splitting prism Bs and three reflecting surfaces of the triad reflecting prism Tp, four in all. In FIG. 1, it is noted that E.P. stands for an eye point.

Figure 3:
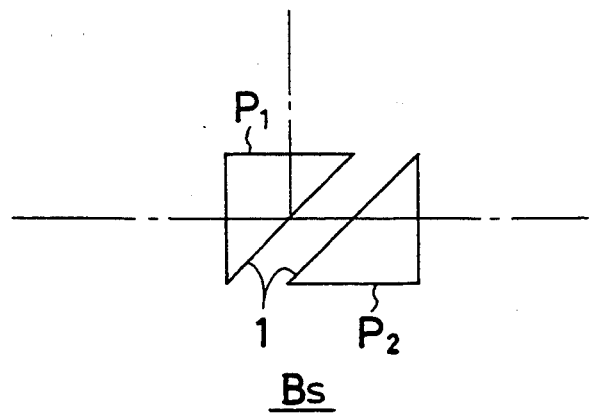
FIG. 3 is an exploded, sectional view of the beam-splitting prism in Example 1.

As illustrated in FIG. 3 in an exploded, sectioned state, the beam splitting prism Bs mentioned above is made up of two triangular prisms P1 and P2 that are cemented together and one of which is processed into a mirror of wavelength selectivity that transmits infrared light and reflects visible light for their separation. The use of a half mirror having such wavelength properties prevents well an unnecessary loss of the quantity of light. It is noted that a half mirror may be used as the optical path-splitting member instead of the beam splitting prism.

Figure 2:
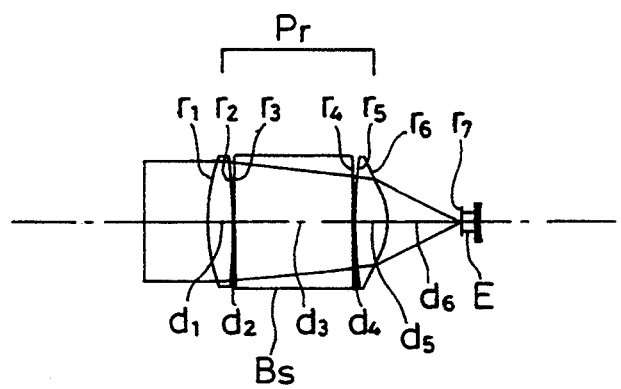
FIG. 2 is a sectional view of the light projection system in Example 1.

As can be seen from the sectional view in the form of FIG. 2, a light projection system Pr consists of, in order from the object side, a positive lens, a beam splitting prism Bs and a positive lens, said positive lens and beam splitting prism Bs located on the object side being common to the objective system Ob of the finder system shown in FIG. 1. Then, a light-emitting element E such as an infrared light-emitting diode is located on the image-forming position.

Figure 4:
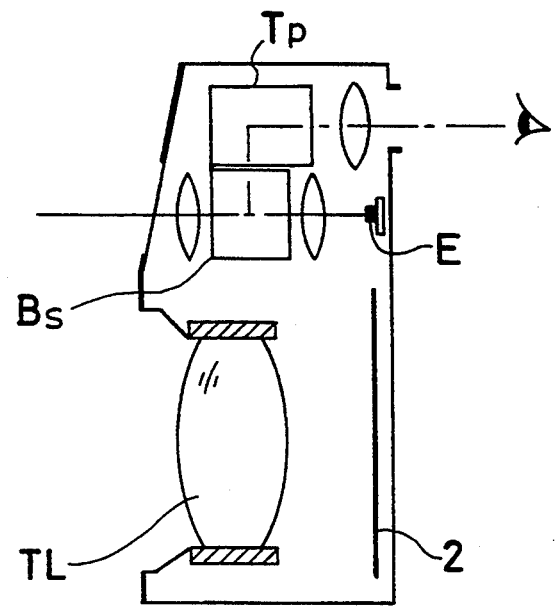
FIG. 4 is a side, sectional view of the camera in Example 1.
Figure 5:
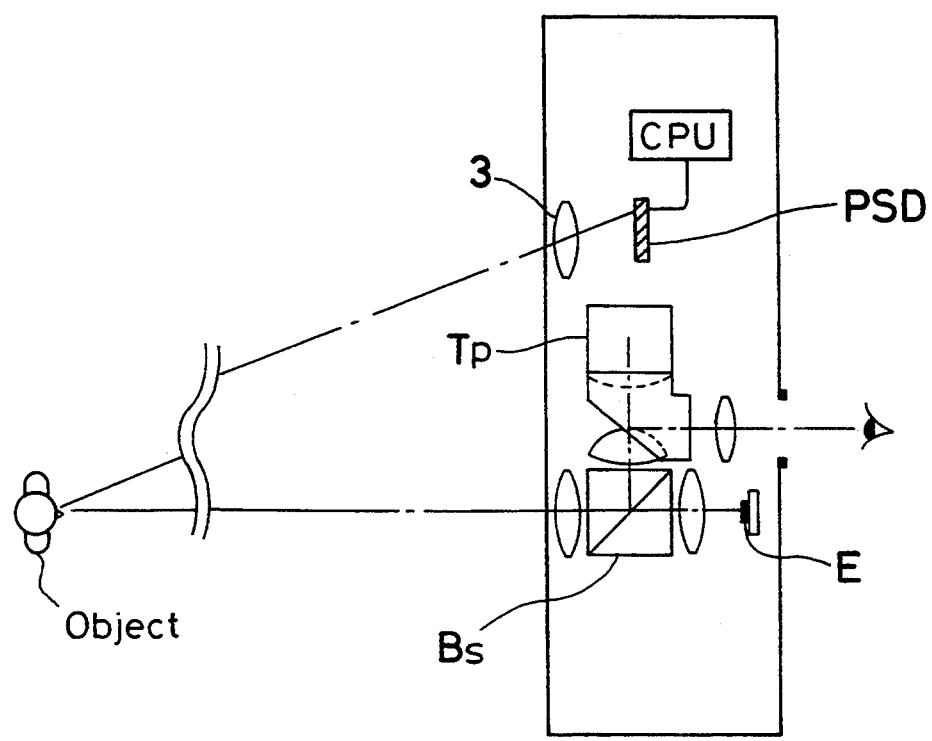
FIG. 5 is an upper, sectional view of the camera in Example 1.
Figure 6:
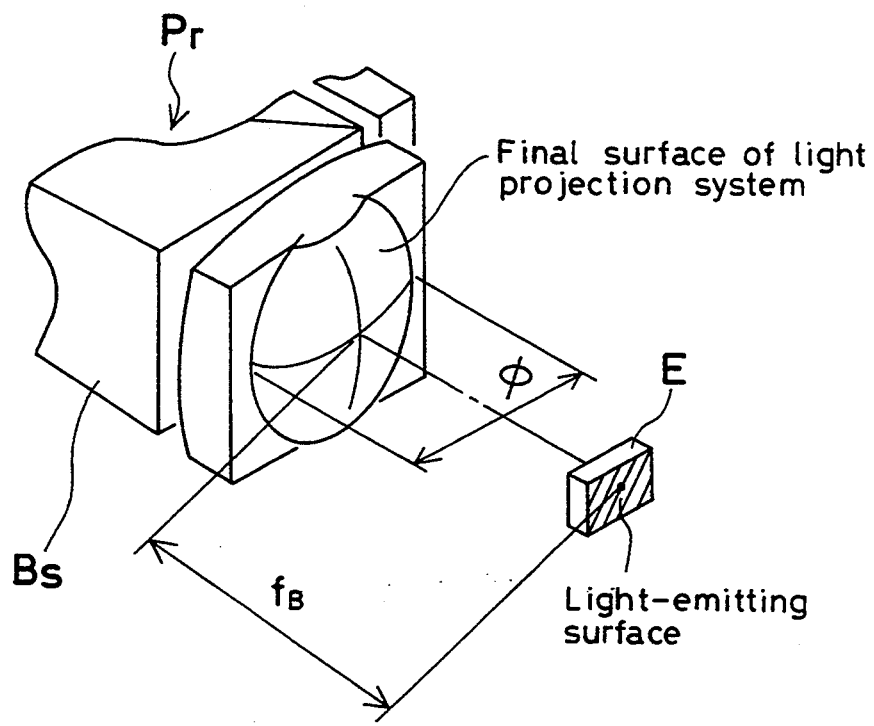
FIG. 6 is a perspective view showing the diameter of the maximum circle that encircles the final surface of the projection system on the light-emitting element side and the space between that final surface thereof and the light-emitting surface of the light-emitting element.

FIGS. 4 and 5 are the side and upper, sectional views of one example in which the finder and light projection (Pr) systems mentioned above are built in a camera. Through the finder system, visible light is reflected by the beam splitting prism Bs in the horizontal direction, then focused to form an intermediate image, and guided to an ocular window in the rear side of the camera through the triad reflecting prism Tp, the perspective view of which is given in the form of FIG. 7.

Through the range finding system, the infrared light emitted by the light-emitting element E transmits through the beam splitting prism Bs and is projected on the object. Since the optical axis of the projected light flux is in coincidence with that of the finder system, it is assured that the projected light spot strikes on the object that is in alignment with the range finding frame of the finder system.

The infrared light reflected by the object is focused by a light reception lens 3 on a semiconductor positive sensor device PSD to send an electrical signal corresponding to the position of the light received, which then enters a computing processing unit CPU for finding the distance of the object. After that, a taking lens TL is moved in association with the distance of the object, so that the well-focused image of the object is formed on film 2 for photography.

Figure 8:
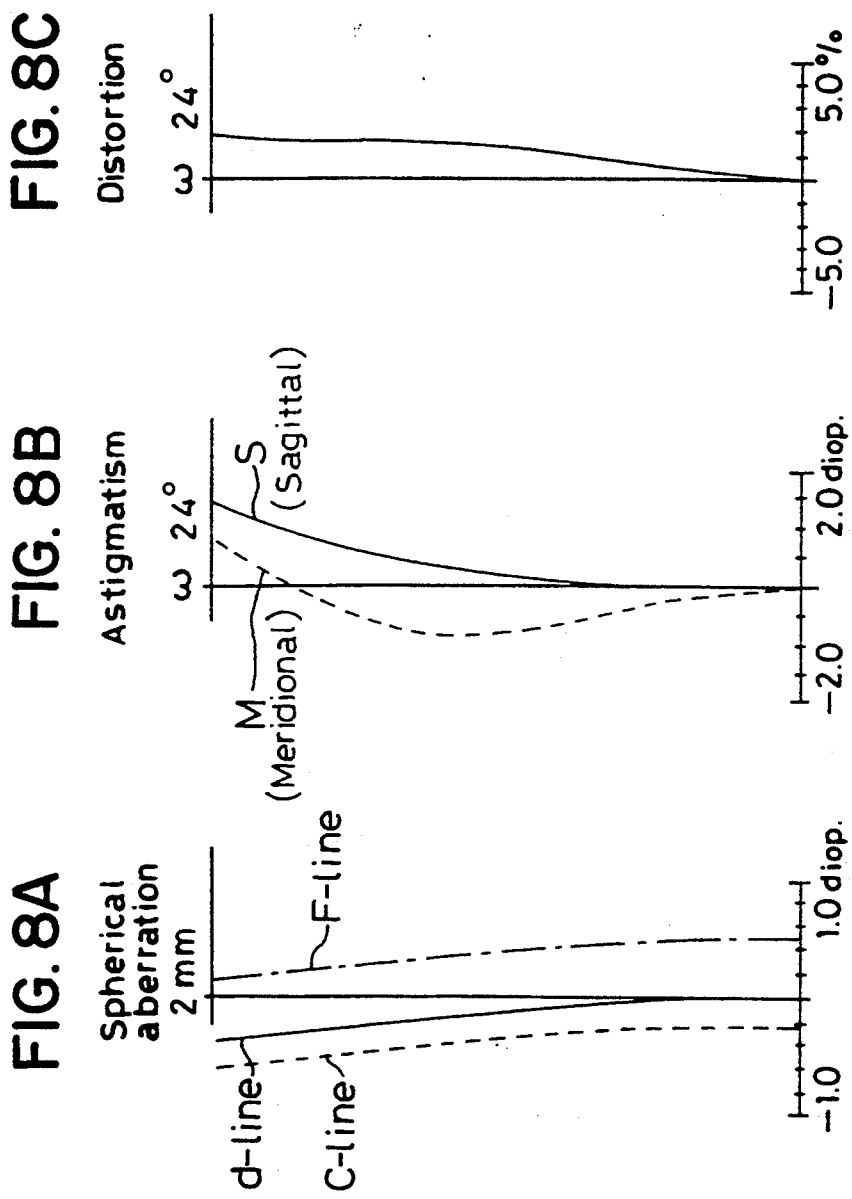
FIG. 8 is an aberration diagram showing the spherical aberration, astigmatism and distortion of the finder system in Example 1.
Figure 9:
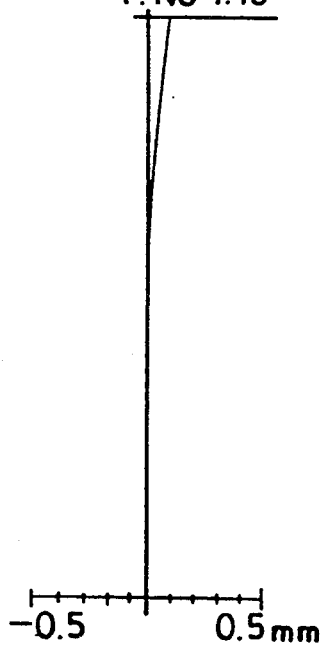
FIG. 9 is an aberration diagram showing the spherical aberration of the projection system in Example 1
Figure 10:
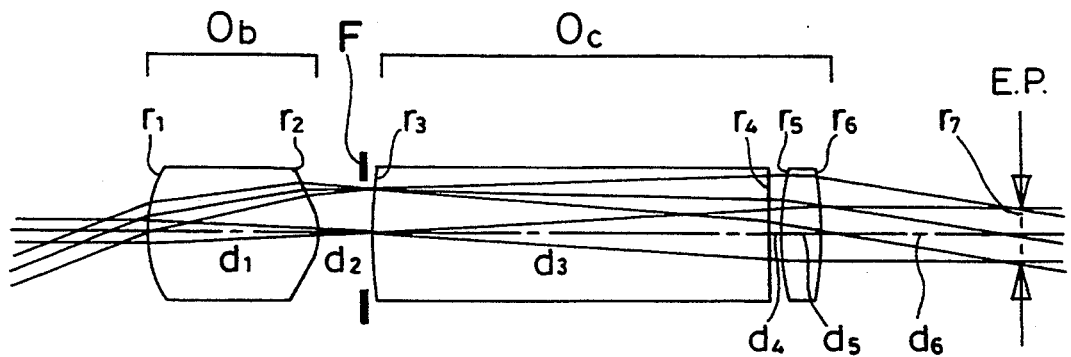
FIG. 10 is a sectional view of the finder system in Example 2.
Figure 11:
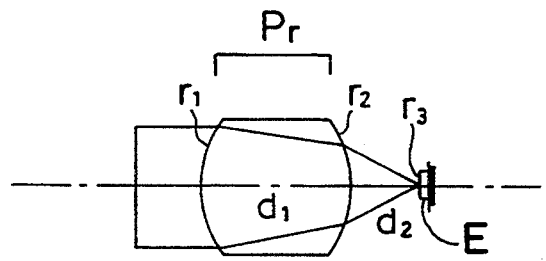
FIG. 11 is a sectional view of the projection system in Example 2.
Figure 12:
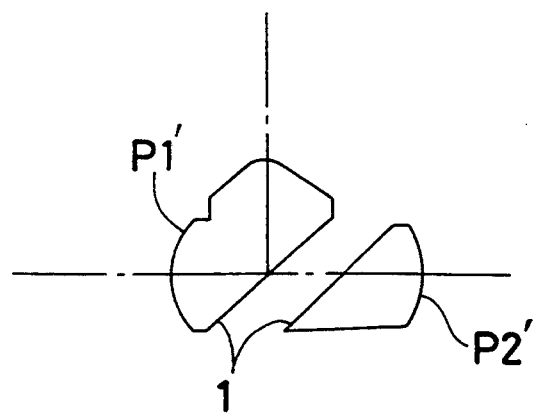
FIG. 12 is an exploded, sectional view of the beam-splitting prism type lens in Example 2.

The spherical aberration, astigmatism and distortion of the finder system according to Ex. 1, the lens data of which will be given later, are shown in the aberration diagram of FIG. 8, and the spherical aberration of the light projection system according to Ex. 2, the lens data of which will be referred to later, is shown in the aberration diagram of FIG. 9. Referring then to Example 2, an objective system Ob constructed by making the objective system Ob of Example 1 an integral piece or a prism form of lens, as illustrated in section in FIG. 10. As shown in FIG. 12 in an exploded, sectional state, a prism Pi' forming this lens and a prism P2' forming a lens after the split optical path surface are bonded together on a cementing surface 1 to constitute an optical path-splitting member. As is the case with Example 1, the bonded surfaces are processed into a mirror of wavelength selectivity. It is noted that a light projection system Pr is made up of an integral, positive lens as well, as shown in FIG. 11 in section.

Figure 13A:
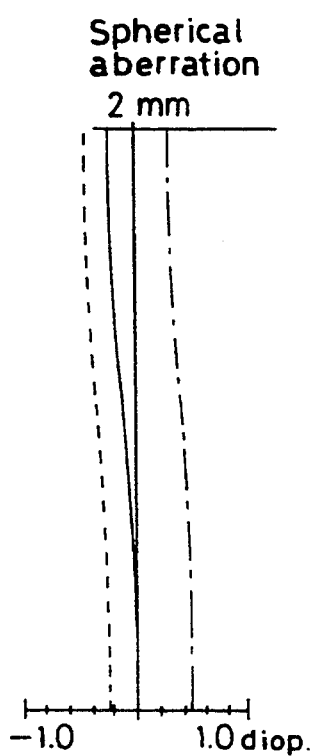
FIG. 13 is an aberration diagram showing the spherical aberration, astigmatism and distortion of the finder system in Example 2.
Figure 13B:
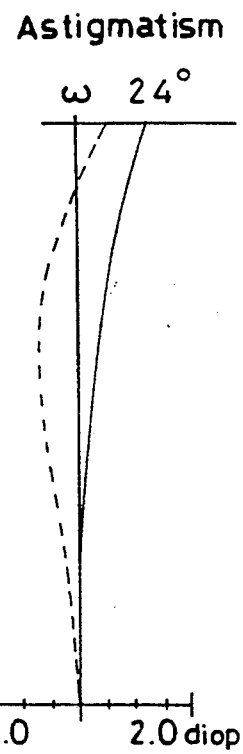
Figure 13C:
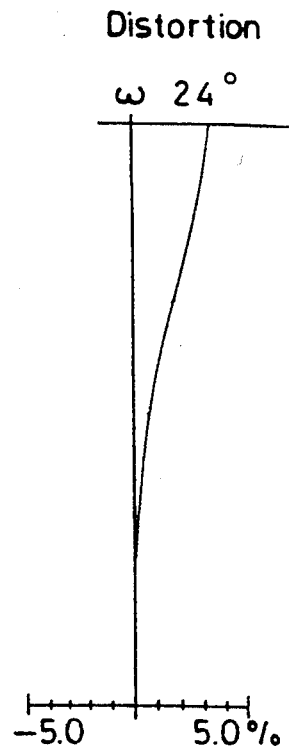
Figure 14:
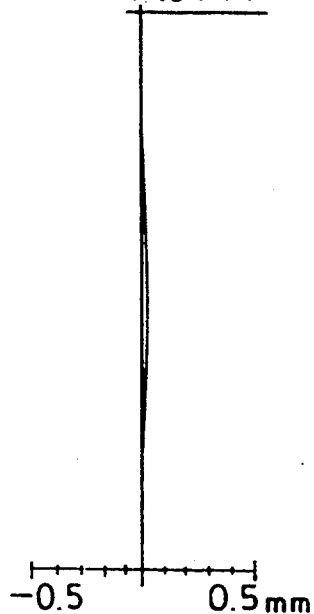
FIG. 14 is an aberration diagram showing the spherical aberration of the projection system in Example 2.

The lens data of the finder system shown in FIG. 10 and the lens data of the light projection system shown in FIG. 11 will be given later, and the aberration diagram showing spherical aberration, astigmatism and distortion of the finder system according to Example 2 and that showing the spherical aberration of the light projection system according to Example 2 are given in FIGS. 13 and 14, respectively.

Example 3 is directed to the application of the invention to a zoom camera. As can be seen from the sectional views of FIG. 15 at the (a) wide angle end, (b) intermediate field angle and (c) telephoto end, the finder system is made up of an objective system Ob consisting of, in order from the object side, a positive lens, a negative lens and a beam splitting prism type lens with both its incident and exit surfaces having positive refracting powers, as is the case with Example 2, and is such designed as to focus the image produced by the objective system Ob on the incident surface of a triad reflecting prism Tp. The objective system Ob is such designed as to relatively move the positive and negative lenses for zooming. The arrangement after the intermediate image-forming surface is similar to that in Example 1.

Figure 16A:
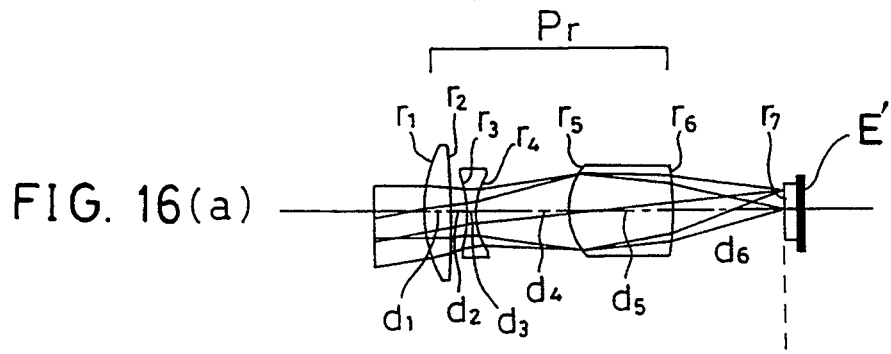
Figure 16B:
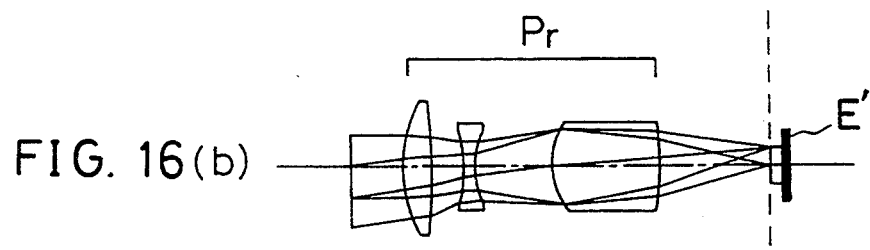
Figure 16C:
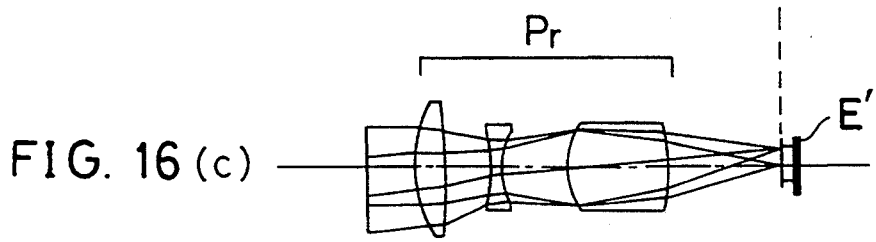
Figure 17:
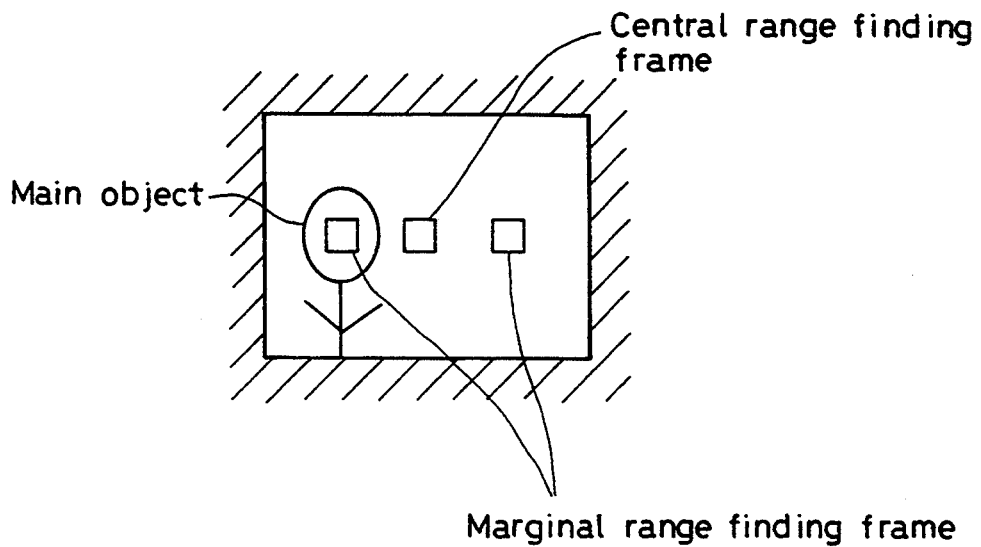

As can be seen from FIG. 16 that illustrates in section the light projection system Pr at the (a) wide angle end, (b) intermediate field angle and (c) telephoto end, that system Pr is common to the finder system in respect of the incident surface to object side of the beam splitting prism type lens. At the image-forming position of the light projection system Pr there is located a light-emitting element E' such as an IRED that includes three light-emitting portions at the center of the optical axis and two regions therearound. By projecting light on three spots on the object, it is possible to ward off an undesired phenomenon that when a main object is absent at the center of the image plane, some background distance is so found that the resulting picture is out of focus. With the instant example specially designed such that the zooming system is made common to the finder and light projection systems, it is possible to mark in the finder system the range finding frame showing surrounding spots on which light is projected. This is because even when there is a change by zooming in the angle of the marginal light projected, there is a concurrent change in the finder's field angle, so that the location of the projected spot can remain constant on the finder's image plane. This assures the photographer of finding the distance of the object to be shot at.

Figure 18:
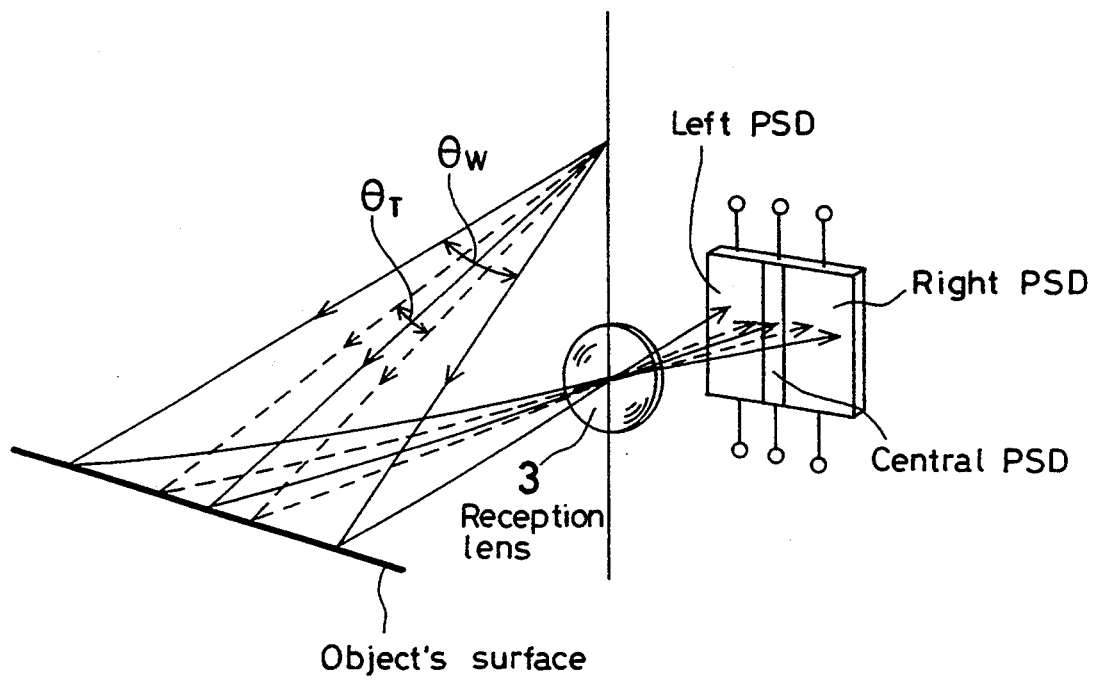
FIG. 18 is a perspective view showing the construction of the light receptor system in Example 3.
Figure 19A:
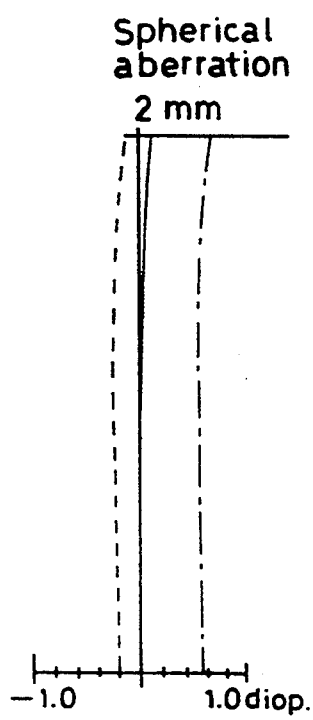
FIG. 19 is an aberration diagram showing the spherical aberration, astigmatism and distortion of the finder system in Example 3 at the (a) wide angle end, (b) intermediate field angle and (c) telephoto end.
Figure 19B:
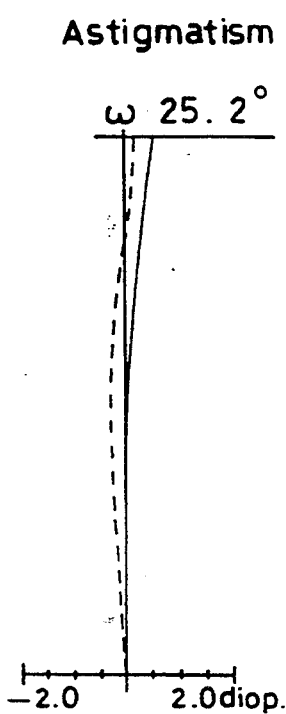
Figure 19C:
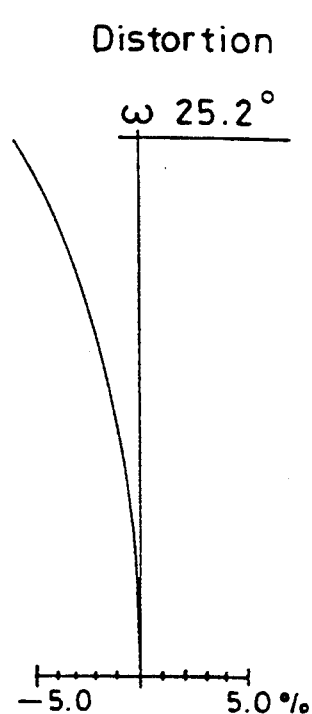
Figure 19D:
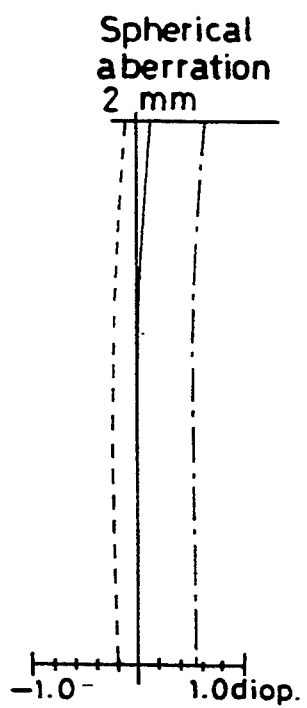
Figure 19E:
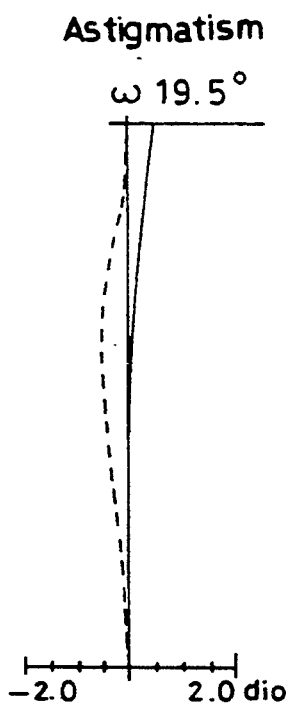
Figure 19F:
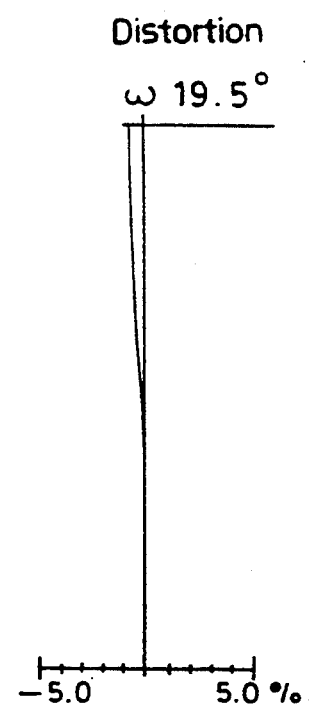
Figure 19G:
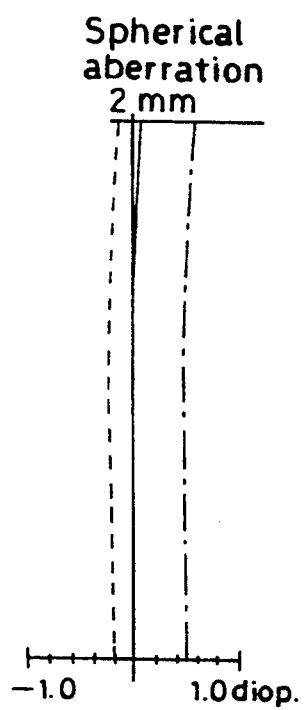
Figure 19H:
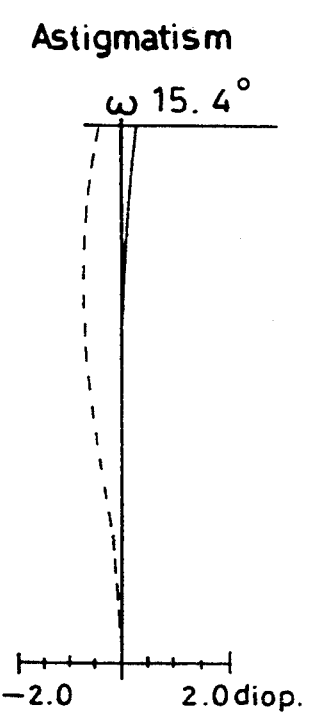
Figure 19I:
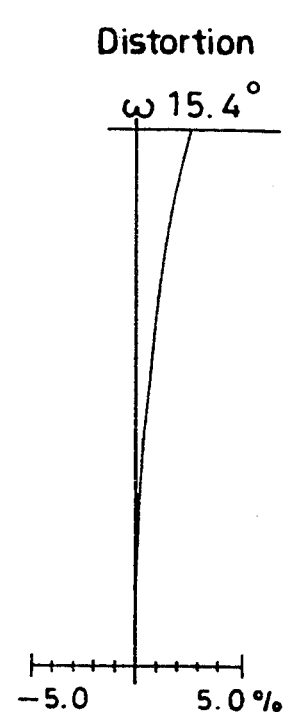
Figure 20A:
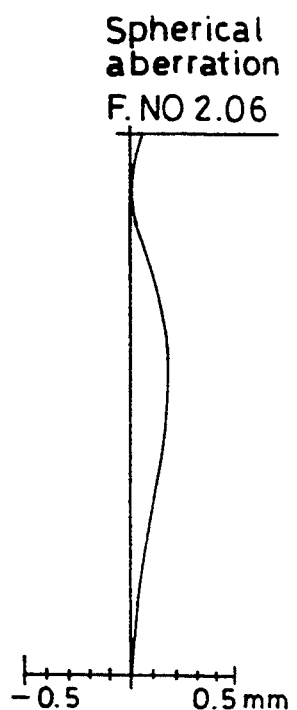
FIG. 20 is an aberration diagram showing the spherical aberration, astigmatism and distortion of the light projection system in Example 3 at the (a) wide angle end, (b) intermediate field angle and (c) telephoto end.
Figure 20B:
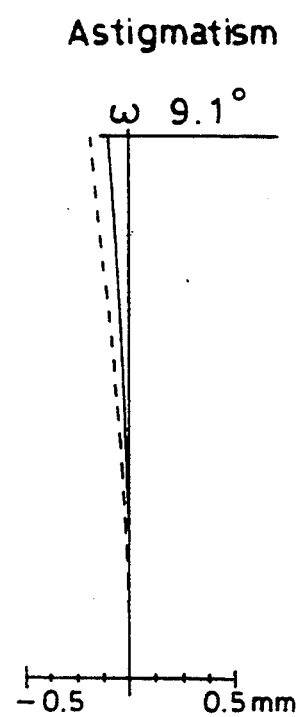
Figure 20C:
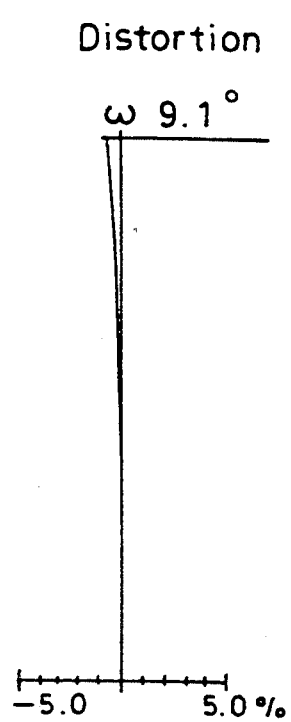
Figure 20D:
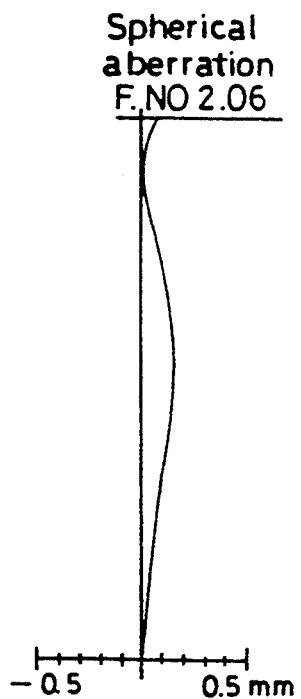
Figure 20E:
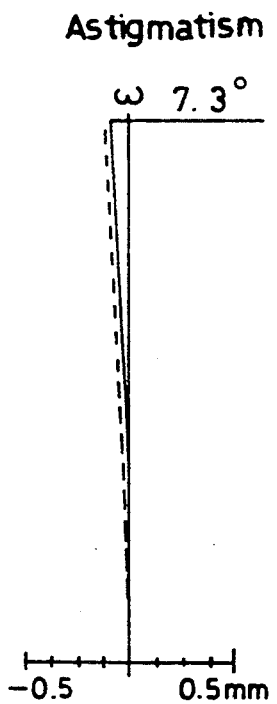
Figure 20F:
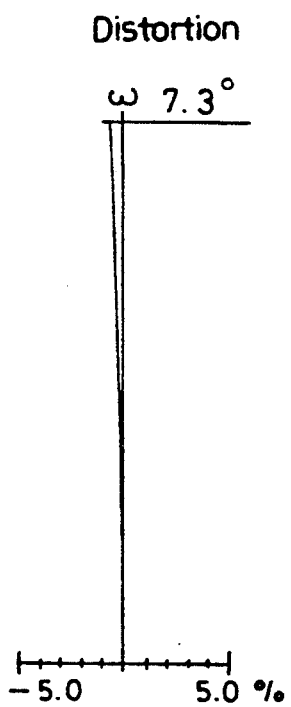
Figure 20G:
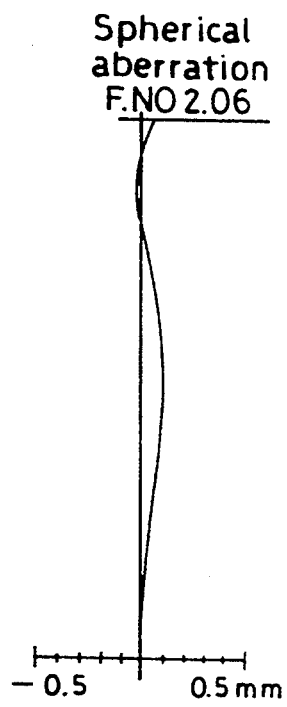
Figure 20H:
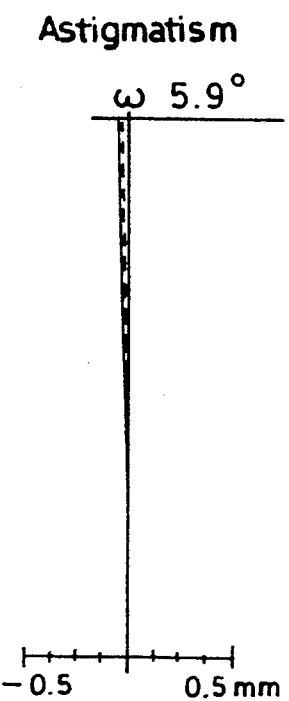
Figure 20I:
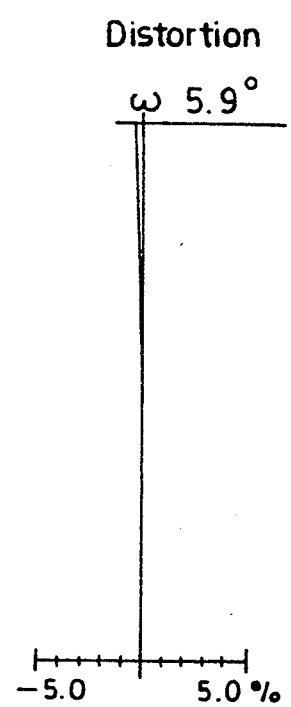

It is noted that the light reception system can receive the light reflected from the object, even when there is a change in the angles ($\theta_W$, $\theta_T$) of projection. In this case, it is unnecessary to use a zooming optical system but, as shown in FIG. 18, it is necessary to increase the width of the light reception region of the surrounding PSD.

Figure 15:
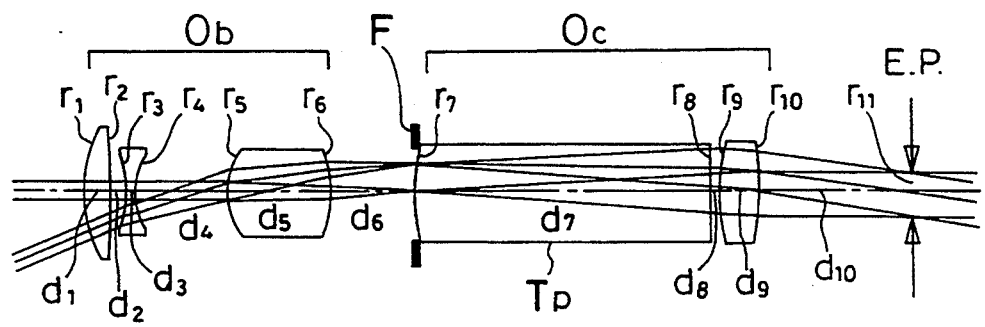
FIG. 15 represents in section the finder system in Example 3 at the (a) wide angle end, (b) intermediate field angle and (c) telephoto end.
Figure 15:
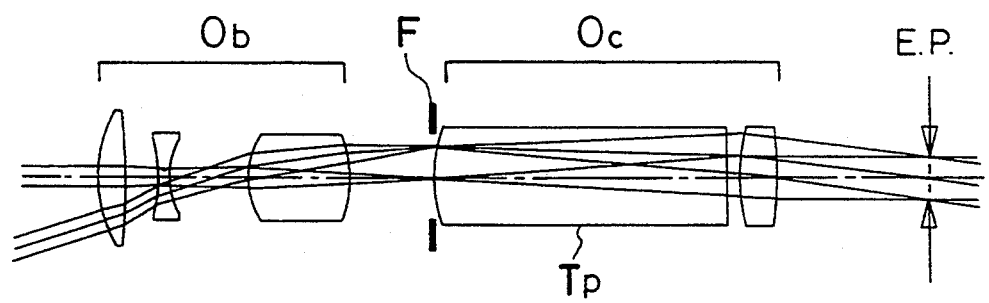
Figure 15:
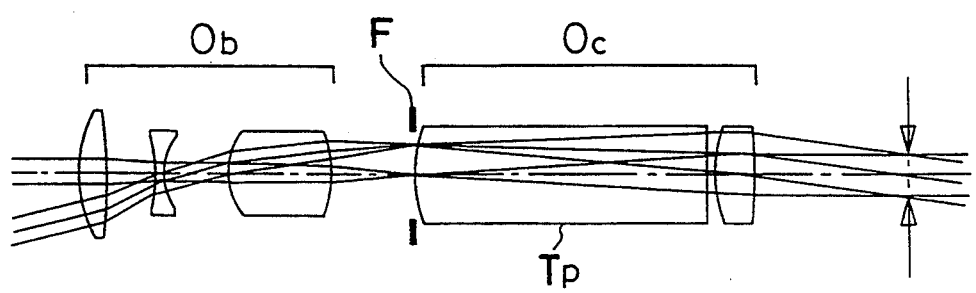

The lens data of the finder system shown in FIG. 15 and the light projection system shown in FIG. 16 will be given later, and the spherical aberration, astigmatism and distortion of the finder system according to Example 3 at the (a) wide angle end, (b) intermediate field angle and (c) telephoto end are diagramatically shown in FIG. 19, while those of the light projection system according to Example 3 in FIG. 20.

Enumerated below are the lens data of the finder and light projection systems according to Examples 1-3. It is noted, however, that the symbols used hereinafter but not hereinbefore mean:

MG is the magnification of finder,
ω is the half field angle,
f is the focal lengths of the light projection systems,
$F_{NO.}$ is the F-numbers of the light projection systems,
$r_1, r_2 \ldots$ are the radii of curvature of the lens surfaces,
$d_1, d_2 \ldots$ are the spaces between the lens surfaces,
$n_{d1}, n_{d2} \ldots$ are the d-line refractive indices of the lenses,
$\nu_{d1}, \nu_{d2} \ldots$ are the Abbe's numbers of the lenses, and
$n_{900,1}, n_{900,2} \ldots$ are the refractive indices at 900 nm of the lenses.

It is also noted that the aspherical configuration applied in the invention is given by $$x = (y^2/r)/[1 + \{1 - P(y^2/r^2)\}^{\frac{1}{2}}/] + A_4 y^4 + A_6 y^6 + A_8 y^8$$

where
x is the optical axis direction,
y is the direction normal to the optical axis,
r is the paraxial radius of curvature,
P is the conical coefficient, and
$A_4, A_6$ and $A_8$ are the aspherical coefficients.

Example 1
[Finder System]
MG = ×0.40, ω = 24°

| | | |
|---|---|---|
| $r_1 = 11.183$ (Aspheric) | $d_1 = 1.9$ | $n_{d1} = 1.49241$ $\nu_{d1} = 57.66$ |
| $r_2 = -100.000$ | $d_2 = 0.2$ | |
| $r_3 = \infty$ | $d_3 = 9.0$ | $n_{d2} = 1.49241$ $\nu_{d2} = 57.66$ |
| $r_4 = \infty$ | $d_4 = 0.2$ | |
| $r_5 = 100.000$ | $d_5 = 3.49$ | $n_{d3} = 1.49241$ $\nu_{d3} = 57.66$ |
| $r_6 = -3.958$ (Aspheric) | $d_6 = 4.82$ | |
| $r_7 = 21.500$ | $d_7 = 30.0$ | $n_{d4} = 1.49241$ $\nu_{d4} = 57.66$ |
| $r_8 = \infty$ | $d_8 = 0.78$ | |
| $r_9 = 16.093$ (Aspheric) | $d_9 = 2.48$ | $n_{d5} = 1.49241$ $\nu_{d5} = 57.66$ |
| $r_{10} = -31.759$ | $d_{10} = 15.0$ | |
| $r_{11} = $ [Eye Point] | | |

Aspherical Coefficients
1st surface
P = −0.5320
$A_4 = -0.19713 \times 10^{-3}$
$A_6 = -0.21883 \times 10^{-5}$
$A_8 = -0.78732 \times 10^{-7}$
6th surface
P = 0.2428
$A_4 = 0.14551 \times 10^{-2}$
$A_6 = -0.30682 \times 10^{-4}$
$A_8 = 0.10655 \times 10^{-5}$
9th surface
P = 1.0
$A_4 = -0.19777 \times 10^{-3}$
$A_6 = 0.62186 \times 10^{-5}$
$A_8 = -0.94839 \times 10^{-7}$

[Light Projection System]
f = 10.15 mm
$F_{NO.} = 1.13$

| | | |
|---|---|---|
| $r_1 = 11.183$ (Aspheric) | $d_1 = 1.9$ | $n_{900,1} = 1.48536$ |
| $r_2 = -100.000$ | $d_2 = 0.2$ | |
| $r_3 = \infty$ | $d_3 = 9.0$ | $n_{900,2} = 1.48536$ |
| $r_4 = \infty$ | $d_4 = 0.2$ | |
| $r_5 = 100.$ | $d_5 = 2.34$ | $n_{900,3} = 1.48536$ |
| $r_6 = -5.665$ (Aspheric) | $d_6 = 5.66$ | |
| $r_7 = $ (IRED) | | |

Aspherical Coefficients
1st surface
P = −0.5320
$A_4 = -0.19713 \times 10^{-3}$
$A_6 = -0.21883 \times 10^{-5}$
$A_8 = -0.78732 \times 10^{-7}$
6th surface
P = 0.9328
$A_4 = 0.16010 \times 10^{-2}$
$A_6 = -0.77110 \times 10^{-5}$
$A_8 = 0.22970 \times 10^{-6}$
$\phi > 6.5$, $f_B = 5.66$, $\phi/f_B > 1.15$ Example 2
[Finder System]
MG = ×0.40, ω = 24°

| | | |
|---|---|---|
| $r_1 = 7.813$ (Aspheric) | $d_1 = 12.79$ | $n_{d1} = 1.49241$ $\nu_d = 57.66$ |
| $r_2 = -4.355$ (Aspheric) | $d_2 = 4.02$ | |
| $r_3 = 32.232$ | $d_3 = 30.13$ | $n_{d2} = 1.49241$ $\nu_d = 57.66$ |
| $r_4 = \infty$ | $d_4 = 0.7$ | |
| $r_5 = 15.009$ (Aspheric) | $d_5 = 3.16$ | $n_{d3} = 1.49241$ $\nu_d = 57.66$ |
| $r_6 = -34.913$ | $d_6 = 15.0$ | |
| $r_7 = $ [Eye Point] | | |

Aspherical Coefficients
1st surface
P = −0.0610
$A_4 = -0.14570 \times 10^{-3}$
$A_6 = 0$
$A_8 = 0$
2nd surface
P = 0.1794
$A_4 = 0.13833 \times 10^{-2}$
$A_6 = 0.24734 \times 10^{-4}$
$A_8 = -0.66349 \times 10^{-6}$
5th surface
P = 1.0
$A_4 = -0.19434 \times 10^{-3}$
$A_6 = 0.77733 \times 10^{-5}$
$A_8 = -0.15217 \times 10^{-6}$

[Light Projection System]
f = 10 mm
$F_{NO.} = 1.11$

| | | |
|---|---|---|
| $r_1 = 7.813$ (Aspheric) | $d_1 = 11.42$ | $n_{900,1} = 1.48536$ |
| $r_2 = -6.694$ (Aspheric) | $d_2 = 5.27$ | |
| $r_3 = $ (IRED) | | |

Aspherical Coefficients
1st surface
P = −0.0610
$A_4 = -0.14570 \times 10^{-3}$
$A_6 = 0$
$A_8 = 0$
2nd surface
P = 1.0
$A_4 = 0.56220 \times 10^{-3}$
$A_6 = 0.99840 \times 10^{-4}$
$A_8 = -0.43520 \times 10^{-5}$
$\phi > 6$, $F_B = 5.26$, $\phi/f_B > 1.14$ Example 3
[Finder System]
MG = ×0.35 ~ ×0.44 ~ ×0.55
ω = 25.2° ~ 19.5° ~ 15.4°

| | | |
|---|---|---|
| $r_1 = 11.985$ | $d_1 = 2.925$ | $n_{d1} = 1.49241$ $\nu_{d1} = 57.66$ |
| $r_2 = -50.324$ (Aspheric) | $d_2 = $ (Variable) | |
| $r_3 = -9.721$ (Aspheric) | $d_3 = 1.0$ | $n_{d2} = 1.58423$ $\nu_{d2} = 30.49$ |
| $r_4 = 7.328$ | $d_4 = $ (Variable) | |

-continued

| | | | |
|---|---|---|---|
| $r_5 = 5.813$ (Aspheric) | $d_5 = 10.5$ | $n_{d3} = 1.49241$ | $v_{d3} = 57.66$ |
| $r_6 = -7.078$ (Aspheric) | $d_6 = 8.268$ | | |
| $r_7 = 14.144$ | $d_7 = 30.0$ | $n_{d4} = 1.49241$ | $v_{d4} = 57.66$ |
| $r_8 = \infty$ | $d_8 = 0.7$ | | |
| $r_9 = 15.090$ (Aspheric) | $d_9 = 4.0$ | $n_{d5} = 1.49241$ | $v_{d5} = 57.66$ |
| $r_{10} = -34.368$ | $d_{10} = 15.0$ | | |
| $r_{11} =$ [Eye Point] | | | |

Zooming Spaces

| MG | ×0.35 | ×0.44 | ×0.55 |
|---|---|---|---|
| $d_2$ | 1.315 | 3.316 | 4.876 |
| $d_4$ | 9.035 | 7.760 | 6.199 |

Aspherical Coefficients

2nd surface
$P = 1.0$
$A_4 = 0.88004 \times 10^{-4}$
$A_6 = -0.11053 \times 10^{-5}$
$A_8 = 0.10553 \times 10^{-7}$ 3rd surface
$P = 1.0$
$A_4 = 0.12665 \times 10^{-2}$
$A_6 = -0.45753 \times 10^{-4}$
$A_8 = 0.10995 \times 10^{-5}$ 5th surface
$P = 1.0$
$A_4 = -0.10343 \times 10^{-2}$
$A_6 = 0.32423 \times 10^{-4}$
$A_8 = -0.14015 \times 10^{-5}$ 6th surface
$P = 1.0$
$A_4 = 0.11272 \times 10^{-2}$
$A_6 = -0.37745 \times 10^{-5}$
$A_8 = 0.14733 \times 10^{-5}$ 9th surface
$P = 1.0$
$A_4 = -0.13389 \times 10^{-3}$
$A_6 = 0.52248 \times 10^{-5}$
$A_8 = -0.12695 \times 10^{-6}$

[Light Projection System]

$f = 10 \sim 12.5 \sim 15.5$ mm
$F_{NO.} = 2.06 \sim 2.06 \sim 2.06$
$\omega = 9.1° \sim 7.3° \sim 5.9°$

| | | | |
|---|---|---|---|
| $r_1 = 11.985$ | $d_1 = 2.925$ | $n_{d1} = 1.49241$ | $v_{d1} = 57.66$ |
| $r_2 = -50.324$ (Aspheric) | $d_2 =$ (Variable) | | |
| $r_3 = -9.721$ (Aspheric) | $d_3 = 1.0$ | $n_{d2} = 1.58423$ | $v_{d2} = 30.49$ |
| $r_4 = 7.328$ | $d_4 =$ (Variable) | | |
| $r_5 = 5.813$ (Aspheric) | $d_5 = 10.5$ | $n_{d3} = 1.49241$ | $v_{d3} = 57.66$ |
| $r_6 = -11.558$ (Aspheric) | $d_7 = 10.808$ | | |
| $r_7 =$ (IRED) | | | |

Zooming Spaces

| f | 10 | 12.5 | 15.5 |
|---|---|---|---|
| $d_2$ | 1.315 | 3.316 | 4.876 |
| $d_4$ | 9.035 | 7.760 | 6.199 |

Aspherical Coefficients

2nd surface
$P = 1.0$
$A_4 = 0.88004 \times 10^{-4}$
$A_6 = 0.11053 \times 10^{-5}$
$A_8 = 0.10553 \times 10^{-7}$ 3rd surface
$P = 1.0$
$A_4 = 0.12665 \times 10^{-2}$
$A_6 = -0.45753 \times 10^{-4}$
$A_8 = 0.10995 \times 10^{-5}$ 5th surface
$P = 1.0$
$A_4 = -0.10343 \times 10^{-2}$
$A_6 = 0.32423 \times 10^{-4}$
$A_8 = -0.14015 \times 10^{-5}$ 6th surface
$P = 1.0$
$A_4 = 0.59100 \times 10^{-3}$
$A_6 = 0.3945 \times 10^{-4}$
$A_8 = -0.1063 \times 10^{-5}$ $\phi > 6.6, f_B = 10.808, \phi/f_B > 0.61$ As explained above, the present invention enables the distance of the object to be shot at to be found by the range finding frame of the finer with certainty and high-enough accuracy, and achieves a compact camera as well.

What we claim is:

1. An active autofocusing type rangefinder optical system for cameras, which is provided separately from a photo-taking optical system, and in which an optical path-splitting means is disposed in an optical path of an objective optical system of said rangefinder optical system, a finger optical system in one optical path split by said splitting means and a range finding optical system in another optical path split by said splitting means, wherein:

said range finding optical system includes a range finding element, an optical system located on the object side from said optical path-splitting means has a positive refracting power as a whole, an optical system extending from said optical path-splitting means to an intermediate image-forming surface of the finder optical system has one of a positive and negative refracting power as a whole, and an optical system located on the side of said range finding element from said optical path-splitting means has a positive refracting power as a whole.

2. An active autofocusing type rangefinder optical system as claimed in claim 1, wherein the range finding element includes a light-emitting element, and a light receiving element is disposed in the finder optical system or in proximity thereto, the object to be photographed being irradiated with the light emitted from the light-emitting element, and the light reflected by the object being received by the light receiving element, so that distance to the object can be found.

3. An active autofocusing type rangefinder optical system as claimed in claim 1, wherein the optical path-splitting means is of such wavelength selectivity as to make a division between a visible range of light and an infrared range of light.

4. An active autofocusing type rangefinder optical system as claimed in claim 2, which conform to the following condition (1):

$$\phi/f_8 > 0.3 \qquad \ldots (1)$$

where $\phi$ is the diameter of the maximum circle that encircles the final surface of said range finding optical system and $f_B$ is the space between the final surface of said range finding optical system and a light-emitting surface of said light-emitting element.

5. An active autofocusing type rangefinder optical system as claimed in any one of claims 1-3, where said finder optical system includes an image-erecting system for inverting and reversing an intermediate image produced by the objective optical system.

* * * * *